(12) United States Patent
Alksnat et al.

(10) Patent No.: US 6,211,577 B1
(45) Date of Patent: Apr. 3, 2001

(54) JUMP START CIRCUIT FOR A VEHICLE BATTERY

(75) Inventors: Holger Alksnat, Gevelsberg; Markus Larisch, Schermbeck; Stefan Kriegesmann, Dortmund, all of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/404,513

(22) Filed: Sep. 23, 1999

(30) Foreign Application Priority Data

Oct. 15, 1998 (DE) .............................. 198 47 669

(51) Int. Cl.$^7$ ....................................... H02J 7/00
(52) U.S. Cl. ..................... 290/37 R; 290/33; 322/13; 320/135
(58) Field of Search ................ 290/37 R, 36 A, 290/38 C, 38 E, 33; 322/13, 16; 320/133, 134, 135

(56) References Cited

U.S. PATENT DOCUMENTS

| | | | |
|---|---|---|---|
| H1172 | * 4/1993 | Gorniak | 307/48 |
| 3,343,057 | 9/1967 | Smith | 320/6 |
| 4,180,746 | * 12/1979 | Giuffa | 307/127 |
| 4,286,172 | * 8/1981 | Millonzi et al. | 307/10 R |
| 4,489,223 | * 12/1984 | Puckett et al. | 191/12.2 R |
| 5,083,076 | * 1/1992 | Scott | 320/2 |
| 5,230,637 | * 7/1993 | Weber | 439/504 |
| 5,297,977 | * 3/1994 | Lamper | 439/504 |
| 5,563,454 | * 10/1996 | Araki et al. | 307/10.6 |
| 5,936,381 | * 8/1999 | Suh | 320/104 |
| 6,002,235 | * 12/1999 | Clore | 320/105 |

FOREIGN PATENT DOCUMENTS

| | | |
|---|---|---|
| 8 87 895 | 7/1953 | (DE) . |
| 92 11 998 U1 | 1/1993 | (DE) . |

* cited by examiner

Primary Examiner—Nicholas Ponomarenko
(74) Attorney, Agent, or Firm—Richard A. Jones

(57) ABSTRACT

A jump start circuit (26) for electrical connection between a battery (12) of a motor vehicle and jump start terminals (22,24) in the motor vehicle, the jump start circuit comprising a switch (28) for positioning in an electrical line (18) between one (22) of the jump start terminals and the battery, the switch being biased to a normally open position; and a logic circuit (32) having means for monitoring the polarity of a voltage across the jump start terminals, means for closing the switch on detection of a predetermined polarity, and a timer circuit for opening the switch after closing for a predetermined period of time. Provides protection against incorrect polarity connection during jump starting.

5 Claims, 1 Drawing Sheet

JUMP START CIRCUIT FOR A VEHICLE BATTERY

TECHNICAL FIELD

The present invention relates to a jump start circuit for protecting a battery of a vehicle during jump starting.

BACKGROUND OF THE INVENTION

When a battery of a first motor vehicle is flat (no power), it is known to connect a battery of a second motor vehicle across the flat battery in order to start the engine of the first vehicle. Such a technique is commonly referred to as jump starting. When the battery of a motor vehicle is not located in the engine compartment, but elsewhere in the vehicle, it has become common practice to provide jump start terminals in the engine compartment which can be connected to a battery of a second vehicle should the battery of the first vehicle go flat. If the second battery is incorrectly connected (that is, the wrong polarity) to the jump start terminals, electrical components in the first vehicle (especially diodes associated with the generator of the first vehicle) may be damaged.

SUMMARY OF THE INVENTION

It is an object of the present invention to overcome the above potential problem.

A jump start circuit in accordance with the present invention, for electrical connection between a battery of a motor vehicle and jump start terminals in the motor vehicle, comprises a switch for positioning in an electrical line between one of the jump start terminals and the battery, the switch being biased to a normally open position; and a logic circuit having means for monitoring the polarity of a voltage across the jump start terminals, means for closing the switch on detection of a predetermined polarity, and a timer circuit for opening the switch after closing for a predetermined period of time.

The jump start circuit of the present invention provides protection against incorrect polarity connection during jump starting.

BRIEF DESCRIPTION OF THE DRAWINGS

The present invention will now be described, by way of example, with reference to the accompanying drawing, in which.

DESCRIPTION OF THE PREFERRED EMBODIMENT

Figure 1:
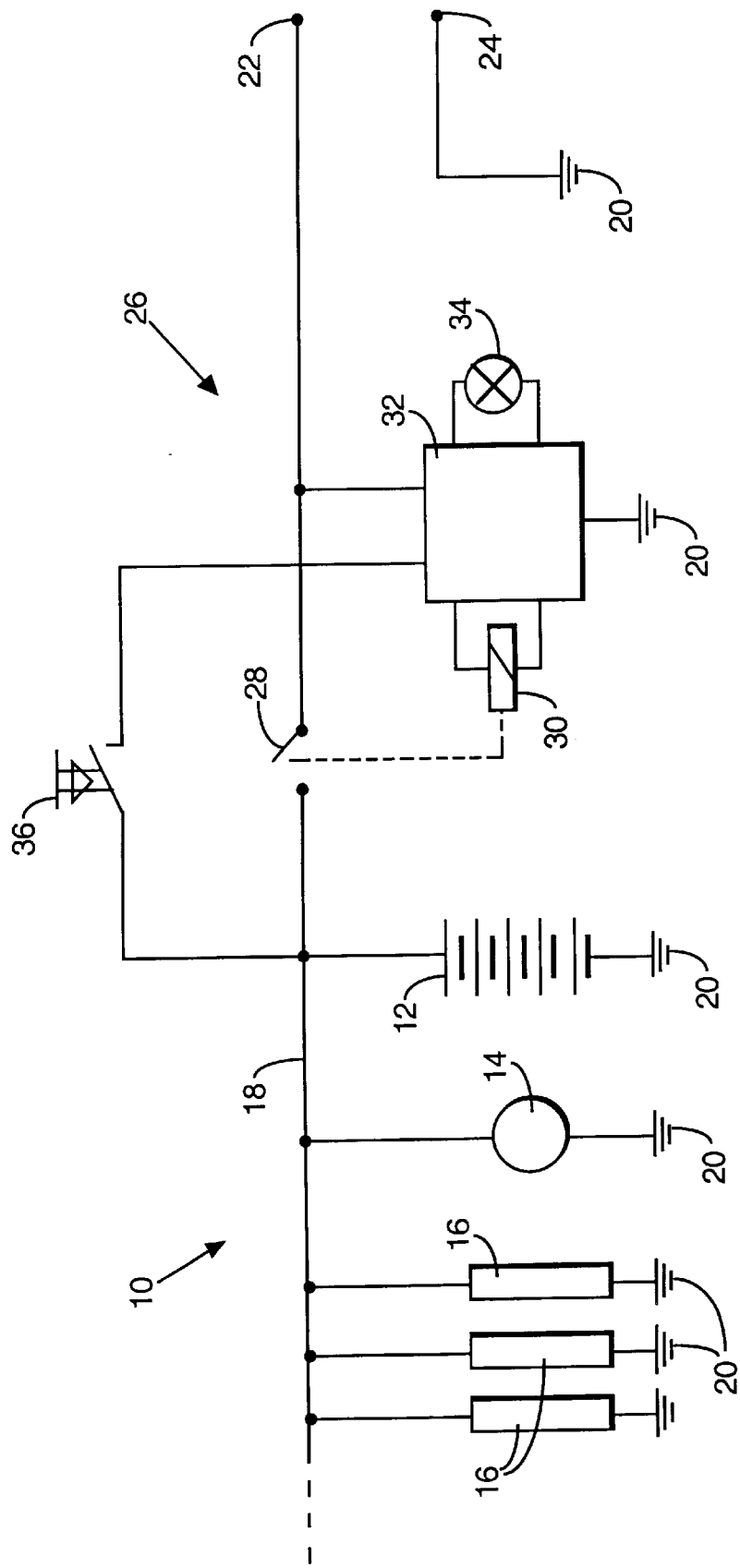
FIG. 1 is a circuit diagram of part of the electrical system of a motor vehicle including a jump start circuit in accordance with the present invention.

The electrical system 10 of a motor vehicle, as shown in FIG. 1, includes a battery 12, a generator 14, and electrical loads 16. The battery 12 normally supplies a voltage between a line 18 and an electrical ground 20. A first jump start terminal 22 is electrically connected to the line 18 and a second jump start terminal 24 is electrically connected to the electrical ground 20, to provide jump start terminals for the battery 12 should the battery go flat (lose power).

A jump start circuit 26, in accordance with the present invention, is electrically connected between the battery 12 and the jump start terminals 22, 24, and between the line 18 and electrical ground 20. The jump start circuit 26 includes a switch 28 positioned in the line 18 between the first jump start terminal 22 and the battery 12. The switch 28 may be an electromechanical device which is actuated by a relay 30, or may be an electronic switch. The switch 28 is normally open and is actuated by a logic circuit 32. The logic circuit 32 includes means for monitoring the polarity of the voltage across the jump start terminals 22, 24.

When the logic circuit 32 detects a voltage across the jump start terminals 22, 24 which is of the correct polarity, the logic circuit actuates the relay 30 to close the switch 28 to allow the voltage across the jump start terminals to reach the battery 12, generator 14 and electrical loads 16. The logic circuit 32 includes a timer circuit which closes the switch 28 for a predetermined period of time, for example, five minutes, and then re-opens the switch. If the logic circuit 32 detects a voltage across the jump start terminals 22, 24 which is of incorrect polarity, the logic circuit will maintain the switch 28 in the open position, or move the switch to the open position if the switch is closed. Any suitable electronic circuitry for polarity monitoring and for the timer circuit may be used in the logic circuit 32.

A status light 34 may be connected to the logic circuit 32 and illuminated by the logic circuit when the switch 28 is closed. A manual override switch 36 may be connected between the battery 12 and the logic circuit 32 to trigger the logic circuit to close the switch 28 in the case where the battery 12 is required to provide a voltage across the jump start terminals 22, 24 for jump starting another vehicle. The logic circuit 32 may also include means to monitor the size of the voltage across the jump start terminals 22, 24 and to open the switch 28 (or to maintain the switch in the open position) when an excessive high voltage is detected.

The present invention provides protection for the battery 12 and other electrical components 14, 16 of the electrical system 10 against the risk of unintentional incorrect polarity connection during jump starting.

What is claimed is:

1. A jump start circuit (26) for electrical connection between a battery (12) of a motor vehicle and jump start terminals (22, 24) in the motor vehicle, the jump start circuit comprising a switch (28) for positioning in an electrical line (18) between one (22) of the jump start terminals and the battery, the switch being biased to a normally open position; and a logic circuit (32) having means for monitoring the polarity of a voltage across the jump start terminals, means for closing the switch on detection of a predetermined polarity, and a timer circuit for opening the switch after closing for a predetermined period of time.

2. A jump start circuit as claimed in claim 1, wherein the switch (28) is an electromechanical switch, and the means for closing the switch includes a relay (30).

3. A jump start circuit as claimed in claim 2, further comprising a status light (34) connected to the logic circuit (32) and being illuminated by the logic circuit on closing of the switch (28).

4. A jump start circuit as claimed in any one of claim 3, further comprising a manual override switch (36) connected to the logic circuit (32) for manually actuating the logic circuit to close the switch (28).

5. A jump start circuit as claimed in any one of claim 4, wherein the logic circuit (32) includes means for monitoring the size of the voltage across the jump start terminals (22, 24) and to open the switch (28) on detection of a voltage above a predetermined voltage.

* * * * *